US009234466B2

United States Patent
Takeuchi et al.

(10) Patent No.: US 9,234,466 B2
(45) Date of Patent: Jan. 12, 2016

(54) DEVICE FOR CONTROLLING INTERNAL COMBUSTION ENGINE

(75) Inventors: Nobutaka Takeuchi, Miyoshi (JP); Yukari Araki, Chiryu (JP); Takashi Suzuki, Gotenba (JP); Masakiyo Kojima, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 13/581,082

(22) PCT Filed: Feb. 26, 2010

(86) PCT No.: PCT/JP2010/053171
§ 371 (c)(1),
(2), (4) Date: Sep. 26, 2012

(87) PCT Pub. No.: WO2011/104885
PCT Pub. Date: Sep. 1, 2011

(65) Prior Publication Data
US 2013/0032101 A1 Feb. 7, 2013

(51) Int. Cl.
*F02D 9/02* (2006.01)
*F02P 5/152* (2006.01)
(Continued)

(52) U.S. Cl.
CPC ............. *F02D 13/0238* (2013.01); *F01P 7/164* (2013.01); *F02D 9/02* (2013.01); *F02D 41/2454* (2013.01); *F02P 5/152* (2013.01); *F02P 5/153* (2013.01); *F01P 2025/30* (2013.01); *F02B 23/104* (2013.01); *F02B 2075/125* (2013.01); *F02D 41/2438* (2013.01); *F02D 2200/021* (2013.01); *F02D 2200/0404* (2013.01);
(Continued)

(58) Field of Classification Search
CPC ........ F01P 7/164; F01P 2025/30; F02D 9/02; F02D 13/0238; F02D 41/2438; F02D 2200/021; F02D 2200/0404; F02D 9/04; F02D 13/0226; F02P 5/152; F02P 5/153; Y02T 10/46; Y02T 10/123
See application file for complete search history.

(56) References Cited

U.S. PATENT DOCUMENTS 5,043,901 A    8/1991  Miyazaki et al.
5,140,955 A *  8/1992  Sono et al. ................. 123/90.15
(Continued)

FOREIGN PATENT DOCUMENTS

JP    A-64-3250      1/1989
JP    U-2-131048     10/1990
(Continued)

OTHER PUBLICATIONS

International Search Report issued in International Application No. PCT/JP2010/053171 dated Jun. 1, 2010.

*Primary Examiner* — Lindsay Low
*Assistant Examiner* — Kevin Lathers
(74) *Attorney, Agent, or Firm* — Oliff PLC

(57) ABSTRACT

The disclosed internal combustion engine has an electric water pump and a water temperature sensor that detects coolant water temperature. An electronic control device stops the driving of the water pump when the coolant water temperature is lower than a baseline temperature. Meanwhile, the electronic control device drives the water pump in accordance with the coolant water temperature when the coolant water temperature is higher than the baseline temperature. When the driving of the water pump is stopped, the internal combustion engine forbids at least one engine control until the water pump is driven.

10 Claims, 6 Drawing Sheets

(51) Int. Cl.
*F02D 13/02* (2006.01)
*F01P 7/16* (2006.01)
*F02P 5/153* (2006.01)
*F02B 23/10* (2006.01)
*F02B 75/12* (2006.01)
*F02D 41/24* (2006.01)

(52) U.S. Cl.
CPC ............... *Y02T10/123* (2013.01); *Y02T 10/18* (2013.01); *Y02T 10/46* (2013.01)

(56) References Cited

U.S. PATENT DOCUMENTS

| | | | |
|---|---|---|---|
| 5,619,957 A * | 4/1997 | Michels | 123/41.44 |
| 6,761,138 B2 * | 7/2004 | Takahashi et al. | 123/90.15 |
| 2003/0019442 A1 | 1/2003 | Yoshikawa et al. | |

FOREIGN PATENT DOCUMENTS

| | | |
|---|---|---|
| JP | A-2001-82189 | 3/2001 |
| JP | A-2003-83133 | 3/2003 |
| JP | A-2003-172141 | 6/2003 |
| JP | A-2003-184556 | 7/2003 |
| JP | A-2004-176623 | 6/2004 |
| JP | A-2005-188464 | 7/2005 |
| JP | A-2006-161623 | 6/2006 |
| JP | A-2006-342680 | 12/2006 |
| JP | A-2007-32411 | 2/2007 |
| JP | A-2007-218115 | 8/2007 |
| JP | A-2008-95593 | 4/2008 |
| JP | A-2008-169750 | 7/2008 |
| JP | A-2008-286173 | 11/2008 |
| JP | A-2009-40234 | 2/2009 |

* cited by examiner

DEVICE FOR CONTROLLING INTERNAL COMBUSTION ENGINE

FIELD OF THE INVENTION

The present invention relates to a control device for an internal combustion engine that includes a cooling device, which circulates coolant using a pump, which is capable of varying the discharge amount independently of the engine speed.

BACKGROUND OF THE INVENTION

In recent years, a type of cooling device has been put into practical use that uses a pump, such as an electric water pump, which is capable of varying the discharge amount independently of the operating state of an engine. In an internal combustion engine equipped with such a pump, the discharge amount of the pump is limited when the coolant temperature is relatively low, for example, during a warm-up to suppress the heat exchange between the whole engine and coolant, thereby promoting the warm-up (for example, refer to Patent Document 1).

PRIOR ART DOCUMENT

Patent Document

Patent Document 1: Japanese Laid-Open Patent Publication No. 2008-169750

SUMMARY OF THE INVENTION

In an internal combustion engine, various control procedures are executed to maintain the engine operating state at an adequate state. For example, a learning control procedure is executed to learn stationary discharge amount between the actual air-fuel ratio and the stoichiometric air-fuel ratio as individual differences or changes over time, for example, of the fuel injection valves. Also, a process for controlling a variable valve timing mechanism is executed to maintain proper valve timing thereby improving the engine performance.

These control procedures need to be executed after obtaining the temperature states of various parts of the internal combustion engine. For example, in the air-fuel ratio control procedure, the deviation between the detected actual air-fuel ratio and stoichiometric air-fuel ratio is greatly influenced by an excessive amount of injected fuel that collects on the walls and imperfect combustion when the warm-up of the internal combustion engine has not been completed. Such a deviation is an inappropriate as a value to be learned as individual differences of the fuel injection valves. In a process for controlling a variable valve timing mechanism, the responsiveness to the control procedure changes in accordance with the temperature of hydraulic oil. It is therefore necessary to obtain the hydraulic oil temperature when the control is executed.

Having a correlation with a detected value of the coolant temperature in general, the temperature states of various parts of an internal combustion engine are determined based on the coolant temperature. However, during a period in which the discharge amount of the pump is limited to quickly warm the engine, the detected value of the coolant temperature and the temperature states of various parts of the engine do not necessarily have a correlation. Therefore, if the above described control procedures are executed during the period, the executed control procedures will have a low reliability. Also, a control procedure that is started when the detected value of the coolant temperature meets a predetermined condition may be started at inappropriate timing.

The above described drawbacks are not unique to the air-fuel ratio learning control procedure and the variable valve timing mechanism control procedure, but are almost common to any type of control procedures of an internal combustion engine that are influenced by the temperature states in various parts in the engine.

Accordingly, it is an objective of the present invention to prevent control procedures from being executed with a low reliability or at an inappropriate timing when the circulation of coolant is limited so that an internal combustion engine is put under a temperature environment that is not normal.

In order to achieve the foregoing objective, and in accordance with one aspect of the present invention, a control device for an internal combustion engine is provided that includes an engine cooling system through which coolant circulates, a coolant temperature detecting section that detects a temperature of the coolant, a pump that is capable of varying the discharge amount of the coolant independently of an engine operating state, and a control section that controls the discharge amount of the pump such that the circulation of the coolant is limited when the coolant temperature is lower than a reference compared to when the coolant temperature is higher than the reference temperature. At least one engine control procedure is inhibited until the limit on the coolant circulation is lifted.

When circulation of coolant is limited to accelerate a warm-up at a cold start, for example, when the circulation of coolant is inhibited, the correlation is weakened between a coolant temperature detected by a coolant temperature detecting section and temperatures at various parts in the internal combustion engine, unlike a case in which such limitation on circulation is not applied. Further, since the circulation of the coolant is limited, a temperature condition might occur that would not occur during a normal operation of the engine. For example, a great temperature difference locally occurs. When an engine control procedure is executed under such conditions, the reliability of the control procedure is degraded. In other cases, a control procedure that does not need to be executed may be executed.

According to the above configuration, control procedures are prevented from being executed with a low reliability or at an inappropriate timing when the circulation of coolant is limited so that an internal combustion engine is put under a temperature environment that is not normal.

The present invention may be embodied such that the control procedure that is inhibited includes a process for introducing the detected coolant temperature as control information.

In a control procedure in which the coolant temperature detected by the coolant temperature detecting section is introduce as control information that has a correlation with a temperature condition of some kind, the control procedure becomes highly likely to be executed with a low reliability or at an inappropriate timing. In this regard, the above described configuration prevents a control procedure from being executed at a low reliability and prevents unnecessary control procedure from being executed.

Also, examples of a process for introducing the detected coolant temperature as control information include a determination process for determining whether the control procedure is allowed to be executed based on the detected coolant temperature, and an arithmetic process in which the detected coolant temperature is used as a variable.

The present invention may be embodied such that the control procedure that is inhibited includes a process for calculating, as a learned value, the degree of a stationary deviation between a control target value of the engine and an actual value.

Even if the degree of a stationary deviation between a control target value of the engine and an actual value is calculated as a learned value when the circulation of coolant is limited so that an internal combustion engine is put under a temperature environment that is not normal, the learned value is not necessarily suitable for engine control after the limitation on the coolant circulation is lifted. The use of the learned value can even degrade the accuracy of the engine control. The present invention prevents such degradation of the engine control.

The prevent invention may be embodied such that the control procedure that is inhibited is an air-fuel ratio learning control procedure and includes a process for correcting a fuel injection amount by using an air-fuel ratio learned value, which is obtained based on tendency of deviation between a control target air-fuel ratio and an actual air-fuel ratio.

According to this configuration, the air-fuel ratio learned value, which has been learned when the circulation of coolant is limited so that the engine is put under a temperature environment that is not normal, is prevented from being reflected on the air-fuel ratio control procedure after the limitation on the circulation is lifted. Accordingly, the controllability is not degraded, and the air-fuel ratio is maintained at a stable state.

The present invention may be embodied to include a hydraulically driven variable valve timing mechanism that changes the valve timing of at least one of an intake valve and an exhaust valve and a correcting section that sets a speed of change of the valve timing based on a predetermined drive signal and executes a correcting process for correcting the drive signal based on the detected coolant temperature. In this case, the control procedure that is inhibited includes the correcting process.

In a hydraulically driven variable valve timing mechanism, the operational responsiveness, that is, the speed of change of the valve timing varies depending on the viscosity, which varies in accordance with the temperature of the hydraulic oil. Also, the temperature of the hydraulic oil has correlation with the coolant temperature. Thus, by correcting a drive signal sent to the variable valve timing mechanism based on the coolant temperature, the speed of change of the valve timing can be set to a desired speed of change irrespective of the temperature condition. However, as described above, when circulation of coolant is limited, the correlation is weakened between the hydraulic oil and the coolant temperature. In such a case, such a correction undesirably degrades the accuracy of control for varying the speed of change of the valve timing or makes the control unstable. In this respect, the above configuration prevents the control accuracy from being degraded and the control from becoming unstable in controlling the speed of change of the valve timing.

The present invention may be embodied to further include a throttle body and a learning section. The throttle body includes an opening degree sensor for detecting an opening degree of an electronic throttle valve, a restricting section that mechanically restricts the opening degree of the throttle valve to a fully closed state, and a circulation passage through which coolant, which forms a part of the engine cooling system, can circulate. The learning section that learns, as a reference opening degree, the opening degree of the throttle valve that is detected by the opening degree sensor under a condition in which the opening degree of the throttle valve is restricted by the restricting section. The control procedure that is inhibited includes the learning executed by the learning section.

In general, the output characteristic of an opening degrees sensor for detecting the opening degree of a throttle valve has dependence on temperature. Thus, even if the reference opening degree of the throttle valve is learned in a state in which circulation of coolant through the circulation passage of the throttle body is limited, the learning result is not necessarily suitable for a procedure for controlling the throttle valve in a normal engine operating state, that is, a state in which coolant circulates through the circulation passage in the throttle body. In accordance with the above configuration, when the reference opening degree is learned under a condition in which circulation of the coolant is limited and then the limitation is lifted, it is possible to prevent the accuracy of the opening degree control procedure from being degraded due to the influence of the limitation.

The present invention may further include a learning section that sets, based on the engine operating state, an ignition timing at which knocking is assumed to never occur. The learning section advances the set ignition timing by a predetermined advancing amount to a timing at which knocking is not detected by a knocking sensor, and the learning section then learns the advancing amount. In this case, the control procedure that is inhibited includes the learning executed by the learning section.

The occurrence of knocking depends to a large extent on the temperature of an engine combustion chamber. Therefore, in a state in which circulation of coolant in an engine cooling system is limited, even if the coolant temperature detected by the coolant temperature detection section is the same, the temperature of the engine combustion chamber varies depending of the external temperature environment and the engine temperature at the start of engine operation. If the amount of advancement of the ignition timing is learned under such a condition, the result of learning does not necessarily represent the occurrence tendency of knocking in a normal engine operating state, that is, a state in which coolant circulates through the engine cooling system. In accordance with the above configuration, the amount of advancement of the ignition timing is learned under a condition in which circulation of coolant is limited, so that it is possible to avoid degradation of the accuracy of the control, which would be brought about when the learned advancement amount is reflected on the ignition timing control after the limitation on the circulation of coolant is lifted.

The present invention may be embodied such that, after the limit on the coolant circulation is lifted, the inhibition of the engine control procedure is continued until the detected coolant temperature converges on a predetermined value and enters an equilibrium condition.

After the limitation on the circulation of coolant is lifted, the engine remains under a temperature environment different from the normal environment until the coolant has circulated in the engine cooling system to some extent and the coolant temperature enters an equilibrium condition, although the temperature gradually converges to a normal temperature. The present invention reliably prevents control procedures from being executed with a low reliability or at an inappropriate timing.

The present invention may be embodied such that, when limiting the circulation of the coolant, the control section stops discharge of the coolant from the pump to inhibit circulation of the coolant in the engine cooling system.

This configuration is capable of executing a warm-up at a cold start at an early stage.

The pump according to the present invention may be an electric pump or an engine driven pump, which is coupled to an engine output shaft via a clutch and is driven by the engine output shaft. In the case of the engine driven pump, the discharge amount of the pump is determined based on the rotation of the engine drive shaft when the clutch is engaged. When the clutch is disengaged, on the other hand, discharge of coolant from the pump is stopped irrespective of the rotational state of the engine drive shaft.

DETAILED DESCRIPTION OF THE PREFERRED EMBODIMENTS

Hereinafter, a control device for an internal combustion engine according to embodiments of the present invention will be described.

(First Embodiment)

Figure 1:
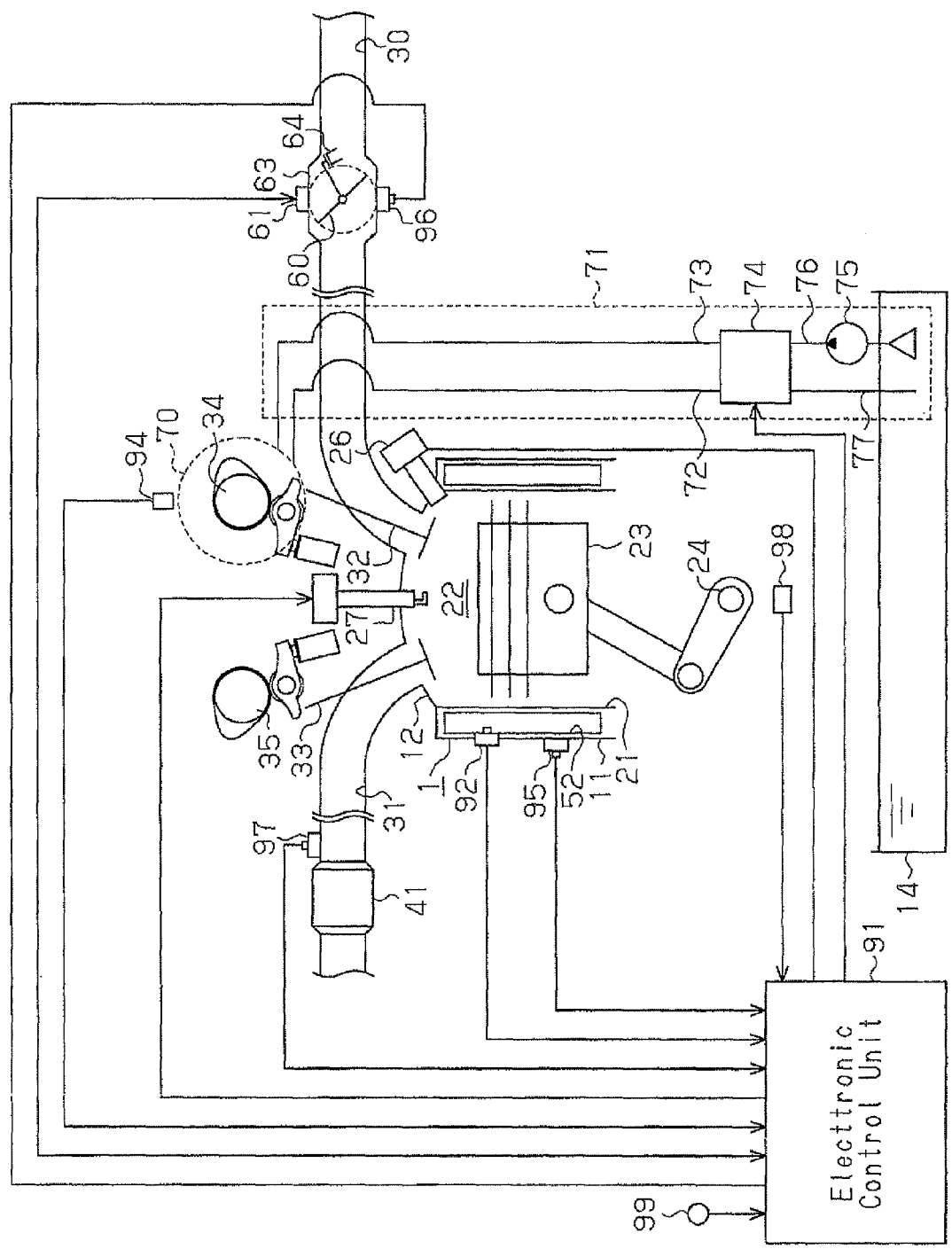
FIG. 1 is a schematic diagram illustrating an internal combustion engine and its control device according to a first embodiment of the present invention.

With reference to FIG. 1, an internal combustion engine according to a first embodiment of the present invention will be described.

As shown in FIG. 1, a cylinder block 11 of an internal combustion engine 1 includes cylinders 21 (only one is shown). Each cylinder 21 accommodates a piston 23, while allowing the piston 23 to reciprocate. A cylinder head 12 is mounted on top of the cylinder block 11, and an oil pan 14 for storing hydraulic oil is attached to the lower end of the cylinder block 11. The internal combustion engine 1 includes combustion chambers 22, each of which is defined by the top of the corresponding piston 23, the inner wall of the corresponding cylinder 21, and the lower surface of the cylinder head 12.

A water jacket 52 is formed inside the cylinder block 11. A coolant temperature sensor 92 for detecting the temperature of coolant (hereinafter, referred to as coolant temperature THW) is attached to the cylinder block 11. Since the coolant temperature THW has correlation with temperatures of various parts of the internal combustion engine 1 and the temperature of the hydraulic oil, the coolant temperature THW is used as a substitute value for these.

An intake passage 30, which is connected to the combustion chambers 22, is partly formed by a throttle body 63. The throttle body 63 incorporates an electronically controlled throttle valve 60. The opening degree (hereinafter referred to as a throttle opening degree TA) of the throttle valve 60 is adjusted by a motor 61, so that the amount of intake air introduced to the combustion chambers 22 (hereinafter referred to as an intake air amount GA) is adjusted. The throttle body 63 has a restricting section 64 for restricting the opening degree of the throttle valve 60 to a fully closed state and a throttle sensor 96 for detecting the opening degree TA.

The cylinder head 12 further has fuel injection valves 26 and ignition plugs 27. Each fuel injection valve 26 injects fuel into one of the combustion chambers 22, and each ignition plug 27 ignites air-fuel mixture in one of the combustion chambers 22. Combustion of air-fuel mixture pushes down each piston 23 to rotate a crankshaft 24, so that drive force is generated. The rotation speed of the crankshaft 24, or the engine speed NE, is detected by a crank angle sensor 98. On the other hand, a cam angle sensor 94 is located in the vicinity of an intake camshaft 34 to detect the rotational phase of the intake camshaft 34. Further, a knocking sensor 95 for detecting knocking, which is caused by abnormal combustion of air-fuel mixture, is attached to a part in the vicinity of one of the combustion chambers 22.

An exhaust purification catalyst 41 for purifying exhaust gas is located in an exhaust passage 31, which is connected to the combustion chambers 22. When combustion is performed around the stoichiometric air-fuel ratio, the exhaust purification catalyst 41 oxidizes hydrocarbon (HC) and carbon monoxide (CO) in the exhaust gas and reduces nitrogen oxide (NOx) in the exhaust gas, thereby purifying the exhaust gas. An air-fuel ratio sensor 97 for detecting oxygen concentration DO in exhaust gas is attached to the exhaust passage 31 at a part in the vicinity of the exhaust purification catalyst 41.

Further, the cylinder head 12 has intake valves 32 and exhaust valves 33 such that the valves 32, 33 can reciprocate. Each intake valve 32 selectively connects and disconnects one of the combustion chambers 22 to and from the intake passage 30. Likewise, each exhaust valve 33 selectively connects and disconnects one of the combustion chambers 22 to and from the exhaust passage 31. The intake valve 32 and the exhaust valve 33 are operated to open and close by the intake camshaft 34 and an exhaust camshaft 35, which are rotated in synchronization with the crankshaft 24, respectively. A variable valve timing mechanism 70 is attached to the intake camshaft 34. The variable valve timing mechanism 70 adjusts the rotational phase relative to the crankshaft 24, thereby advancing or retarding the valve timing of the intake valves 32.

Hydraulic oil is supplied to the variable valve timing mechanism 70 via a hydraulic circuit 71. A phase advancing oil passage 72 and a phase retarding oil passage 73, which form part of the hydraulic circuit 71, respectively connect the variable valve timing mechanism 70 and an oil control valve 74 to each other. The hydraulic circuit 71 further has a supply passage 76 and a drain passage 77. One end of each of the supply passage 76 and the drain passage 77 is connected to the oil control valve 74. The other ends of the supply passage 76 and the drain passage 77 are connected to the oil pan 14. Also, an oil pump 75 for discharging hydraulic oil from the oil pan 14 to the oil control valve 74 is located on the supply passage 76.

The oil control valve 74 moves its spool (not shown) based on a duty cycle DVT of a drive signal output by the electronic control unit 91, thereby controlling supply and drain of hydraulic oil to and from the variable valve timing mechanism 70. In other words, the oil control valve 74 controls supply state and drain state of hydraulic oil in the phase advancing oil passage 72 and the phase retarding oil passage 73.

The electronic control unit 91 receives detection values from various types of sensors connected thereto, including the coolant temperature sensor 92, the cam angle sensor 94, the knocking sensor 95, the throttle sensor 96, the air-fuel ratio sensor 97, the crank angle sensor 98, and an accelerator sensor 99. Based on the received detection values, the electronic control unit 91 executes various types of procedures, such as a fuel injection control procedure, an ignition timing control procedure, a throttle opening degree control procedure.

Figure 2:
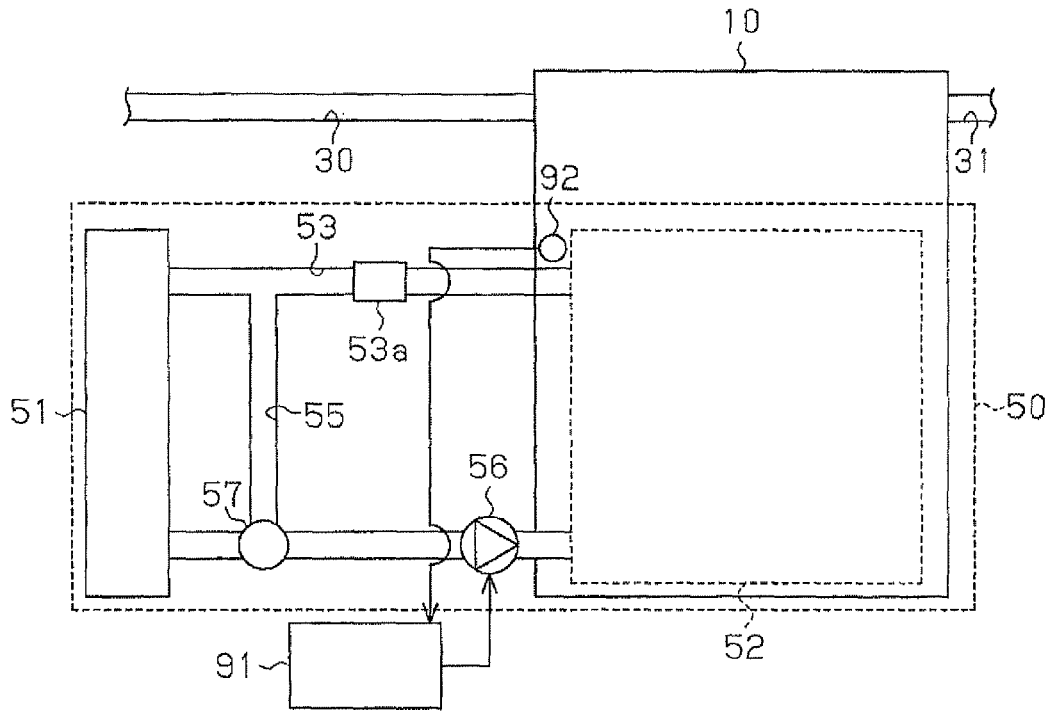
FIG. 2 is a schematic diagram illustrating the cooling device of the internal combustion engine of the first embodiment.

With reference to FIG. 2, a cooling device 50 of the internal combustion engine 1 will be described. The cooling device 50 is formed by a coolant passage 53, which includes an electric water pump 56 and the water jacket 52, the coolant temperature sensor 92 for detecting the coolant temperature THW, a radiator 51 and a thermostat 57. A circulation passage 53a, which forms a part of the coolant passage 53, is formed in the throttle body 63.

The coolant passage 53, which functions as an engine cooling system, includes a bypass passage 55, which bypasses the radiator 51. The thermostat 57 is provided at the downstream end of the bypass passage 55. The thermostat 57 is a pressure-sensitive type having a valve body incorporated therein. The position of the valve body changes in accordance with the coolant temperature THW, so that the communication state at a part of the coolant passage 53 between a section downstream of the radiator 51 and a section upstream of the water pump 56 is changed. Accordingly, the flow rate of coolant circulating in the radiator 51 is adjusted. When the coolant temperature THW is low, coolant is inhibited from entering the water jacket 52 from the radiator 51 and is allowed to enter the water jacket 52 via the bypass passage 55. On the other hand, when the coolant temperature THW increases, the coolant is allowed to enter the water jacket 52 via the radiator 51. In other words, the coolant discharged to the water jacket 52 by the water pump 56 returns to the water pump 56 via the radiator 51. As a result, heat exchange between the coolant and the external air takes place in the radiator 51, so that the coolant temperature THW is lowered.

After starting of the engine 1 is performed, it is preferable to complete warm-up of the engine 1 as early as possible in view of improvement of the fuel economy and combustion stability. Accordingly, the cooling device 50 of the present embodiment stops operation of the water pump 56 and inhibits circulation of coolant in the coolant passage 53 until the warm-up of the engine 1 is completed.

Figure 3:
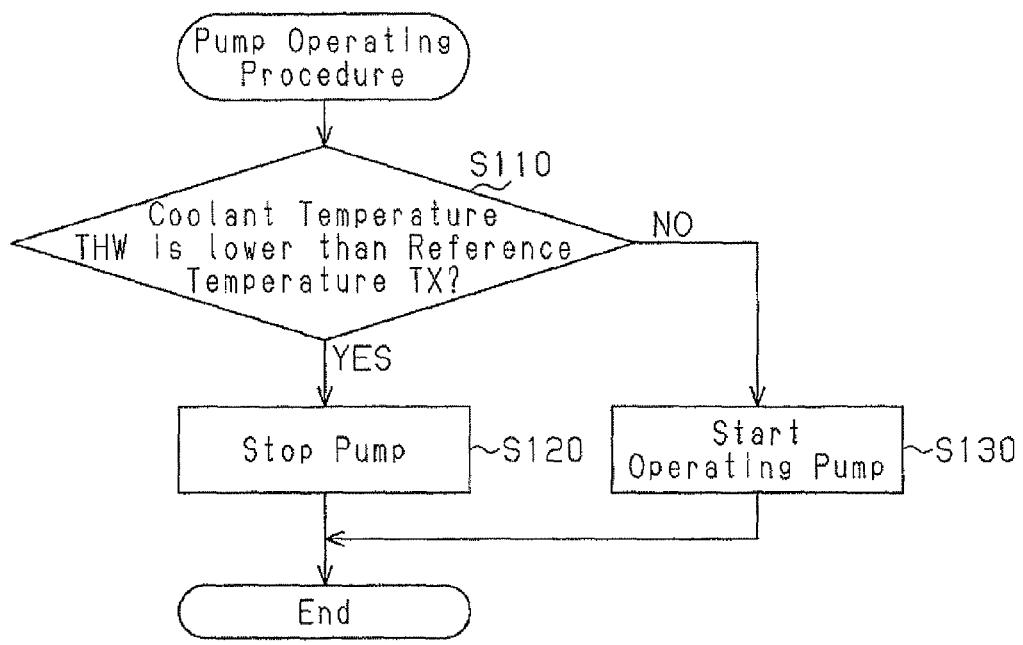
FIG. 3 is a flowchart showing the a pump driving process according to the first embodiment.

With reference to FIG. 3, specific steps of a procedure for controlling operation of the water pump 56 will be described. The procedure is repeated by the electronic control unit 91 at predetermined computation intervals.

The electronic control unit 91 determines whether the coolant temperature THW detected by the coolant temperature sensor 92 is lower than a reference temperature TX (step S110). The reference temperature TX is a value for determining whether the warm-up of the internal combustion engine 1 has been completed, and is set to be lower than the valve opening temperature of the thermostat 57.

When determining that the coolant temperature THW is higher than or equal to the reference temperature TX (step S110: NO), the electronic control unit 91 starts operating the water pump 56 (step S130). In this case, the electronic control unit 91 varies the discharge amount of the water pump 56 in accordance with the coolant temperature THW.

On the other hand, when it is determined that the coolant temperature THW is lower than the reference temperature TX (step S110: YES), the water pump 56 is stopped (step S120). That is, if engine starting is executed under a condition where the coolant temperature THW is lower than the reference temperature TX, for example, when the engine 1 is cold, the water pump 56 remains stopped. Through such a control procedure, the electronic control unit 91 quickly completes the warm-up of the internal combustion engine 1.

Based on the oxygen concentration DO in exhaust gas detected by the air-fuel ratio sensor 97, the electronic control unit 91 corrects the fuel injection amount and the like through feedback such that the air-fuel ratio of the air-fuel mixture to be combusted becomes the stoichiometric air-fuel ratio. Based on an air-fuel ratio correction factor FAF corresponding to the feedback correction amount, the electronic control unit 91 executes air-fuel ratio control process for renewing an air-fuel ratio learned value KG. Since the air-fuel ratio learned value KG corresponds to the degree of the stationary deviation between the stoichiometric air-fuel ratio and the actual air-fuel ratio, the air-fuel ratio learned value KG needs to be renewed when the warm-up of the engine 1 is completed and the engine 1 is in a normal operating state.

Figure 4:
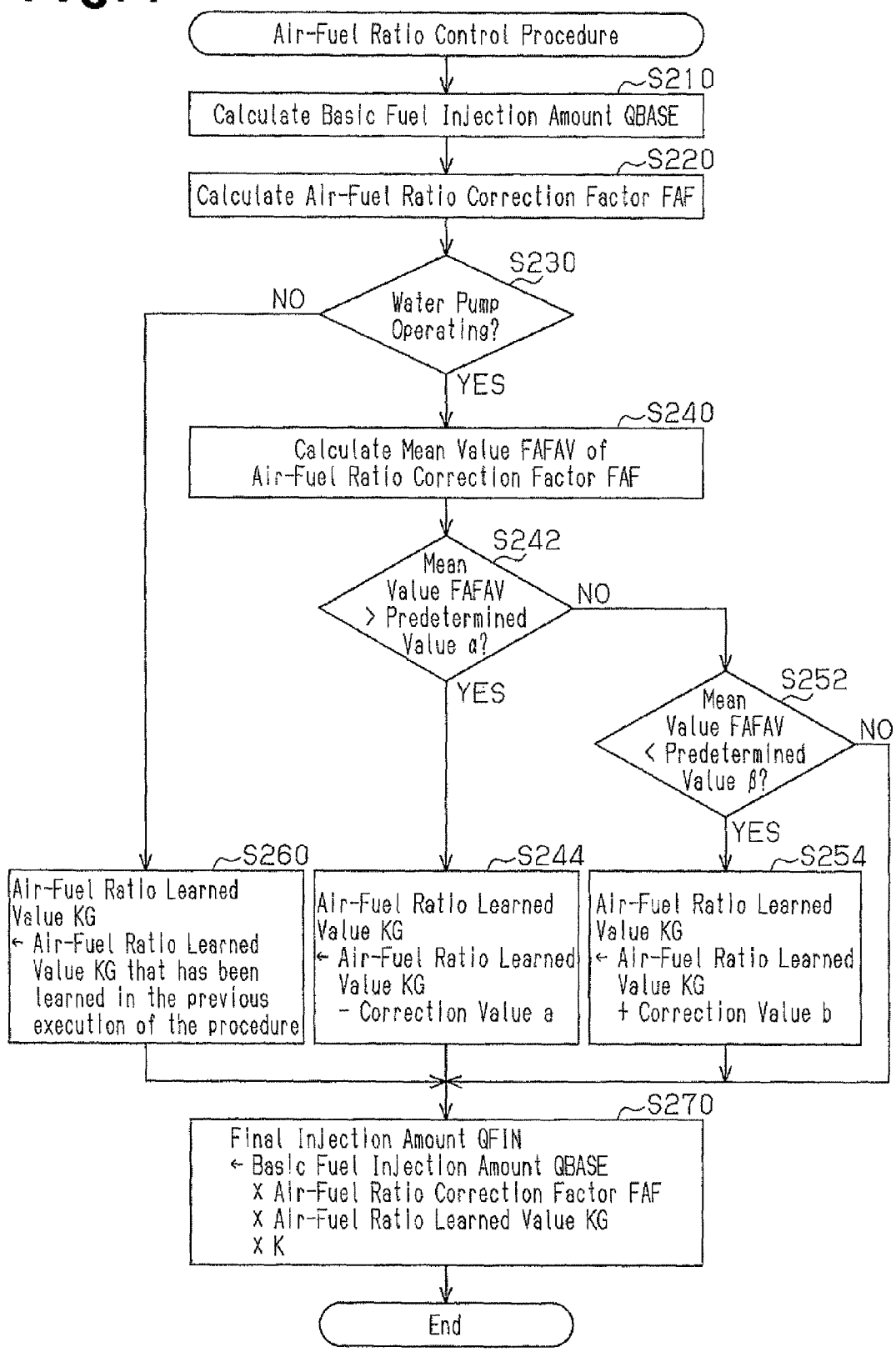
FIG. 4 is a flowchart showing an air-fuel ratio control procedure according to the first embodiment.

In this regard, when the water pump 56 is not operating, a temperature condition that would not occur during a normal engine operation, that is, when coolant is circulating through the engine 1, may occur. For example, great temperature differences occur between various parts of the internal combustion engine 1. Therefore, when the water pump 56 is not operated, the air-fuel ratio learned value KG may be renewed to a value that is inappropriate as a stationary degree of deviation between the stoichiometric air-fuel ratio and the air-fuel ratio. For example, if the coolant temperature THW is higher than or equal to a specific value during the normal operating state, the temperature in the combustion chambers 22 can be assumed to increase as the coolant temperature THW increases. However, such correlation substantially disappears when the water pump 56 is not operated. Thus, for example, even if the coolant temperature THW is higher than or equal to a specific value, a state may appear in which the temperature of the combustion chambers 22 scarcely increases and a great amount of fuel collects on the walls of the combustion chambers 22. Therefore, in the present embodiment, the air-fuel ratio learned value KG is not renewed when the water pump 56 is not operated. Steps of the air-fuel ratio control procedure of the present embodiment will now be described with reference to FIG. 4.

In the procedure, a basic fuel injection amount QBASE is calculated based on the engine speed NE and engine load, which is computed from the intake air amount GA (step S210).

Next, the air-fuel ratio correction factor FAF is calculated based on a detection value of air-fuel ratio sensor 97 (step S220). The oxygen concentration of exhaust gas when the actual air-fuel ratio is equal to the stoichiometric air-fuel ratio is referred to as a reference oxygen concentration. The actual the air-fuel ratio correction factor FAF is used for compensating for a temporary deviation between the reference oxygen concentration and the actual oxygen concentration DO, which is detected by the air-fuel ratio sensor 97. That is, when the oxygen concentration DO detected by the air-fuel ratio sensor 97 is lower than the reference oxygen concentration, that is, when the actual air-fuel ratio is rich, the air-fuel ratio correction factor FAF is changed to a value less than a reference value, which is 1.0. In this case, the air-fuel ratio correction factor FAF is reduced in proportion to the degree of deviation of the actual air-fuel ratio, which is computed from the oxygen concentration DO, from the stoichiometric air-fuel ratio. In contrast, when the oxygen concentration DO detected by the air-fuel ratio sensor 97 is higher than the reference oxygen concentration, that is, when the actual air-fuel ratio is lean, the air-fuel ratio correction factor FAF is changed to a value greater than the reference value, which is 1.0. In this case, the air-fuel ratio correction factor FAF is increased in proportion to the degree of deviation of the actual air-fuel ratio, which is computed from the oxygen concentration DO, from the stoichiometric air-fuel ratio.

Next, it is determined whether the water pump 56 is operating (step S230).

When it is determined that the water pump 56 is operating (step S230: YES), a mean value FAFAV of the air-fuel ratio correction factor FAF is calculated (step S240). Then, it is determined whether the mean value FAFAV of the air-fuel ratio correction factor FAF is greater than a predetermined value a ($\alpha$>1.0) (step S242). If the mean value FAFAV is greater than the predetermined value $\alpha$ (step S242: YES), the air-fuel ratio learned value KG is renewed based on the following expression (1) (step S244).

$$KG \leftarrow KG-a \quad (1)$$

In the expression (1), the value a (a>0) is a predetermined correction value, which is set in advance to be small compared to the amount of change of the air-fuel ratio correction factor FAF.

In contrast, if the mean value FAFAV is less than the predetermined value $\alpha$ (step S242: NO), it is further determined whether the mean value FAFAV is less than a predetermined value $\beta$ ($\beta$<1.0) (step S252). If the mean value FAFAV is less than the predetermined value $\beta$ (step S252: YES), the air-fuel ratio learned value KG is renewed based on the following expression (2) (step S254).

$$KG \leftarrow KG+b \quad (1)$$

In the expression (2), the value b (b>0) is a predetermined correction value, which is set in advance to be small compared to the amount of change of the air-fuel ratio correction factor FAF, as in the case of the correction value a.

In a case where the mean value FAFAV of the air-fuel ratio correction factor FAF is in the range $\beta \leq FAFAV \leq \alpha$ (step S242: NO, step S252: NO), or when the air-fuel ratio learned value KG is renewed (steps S244 and S254), a final injection amount QFIN is calculated based on the following expression (3) (step S270).

$$QFIN \leftarrow QBASE \cdot FAF \cdot KG \cdot K \quad (3)$$

The value K on the right side of the expression (3) represents a correction factor such as an increase at the engine start.

If it is determined that the water pump 56 is not operating at step S230, that is, if it is determined that the warm-up has not been completed and coolant circulation in the coolant passage 53 is inhibited (step S230: NO), the air-fuel ratio learned value KG is set to a value of the air-fuel ratio learned value KG that has been learned in the previous execution of the procedure (step S260). As described above, when the water pump 56 is not operating and the circulation of coolant in the coolant passage 53, which includes the water jacket 52 of the internal combustion engine 1, is inhibited, the air-fuel ratio learned value KG is not renewed. In this case, the final fuel injection amount QFIN is calculated by using a value of the air-fuel ratio learned value KG that has been renewed in the previous normal operation, that is, in a state in which the water pump 56 was operating and the circulation of coolant was permitted.

The electronic control unit 91 calculates a fuel injection period TAU based on the final fuel injection amount QFIN, and opens the fuel injection valves 26 based on the fuel injection period TAU. As a result, an amount of fuel that corresponds to the final fuel injection amount QFIN is injected by each fuel injection valve 26.

The above described embodiment has the following advantages.

(1) When circulation of coolant is inhibited to accelerate the warm-up at a cold start by not operating the water pump 56, a temperature condition might occur that would not occur during a normal operation of the engine 1, for example, a great temperature difference locally occurs in the engine 1, unlike a case in which the water pump 56 is operated and coolant is circulated. If the learning of the air-fuel ratio is executed under such circumstances, the air-fuel ratio learned value KG might be learned in a state in which a great amount of fuel collects on the wall surfaces of the combustion chambers 22. That is, a value that is inappropriate as the degree of stationary deviation between the stoichiometric air-fuel ratio and the actual air-fuel ratio might be learned as the air-fuel ratio learned value KG, which can degrade the reliability of the learning procedure. According to the present embodiment, the air-fuel ratio learned value KG is not renewed while the water pump 56 is stopped. Therefore, the air-fuel ratio control procedure is prevented from being executed based on an unreliable value of the air-fuel ratio learned value KG.

(Second Embodiment)

A second embodiment of the present invention will now be described with reference to FIGS. 1, 5 and 6. The differences from the first embodiment will be mainly discussed. Like or the same reference numerals are given to those components that are like or the same as the corresponding components of the first embodiment.

As shown in FIG. 1, hydraulic oil is supplied to the variable valve timing mechanism 70 via the hydraulic circuit 71. The oil control valve 74 changes the communication state of the supply passage 76 and the drain passage 77, and the phase advancing oil passage 72 and the phase retarding oil passage 73, thereby controlling the supply and drain state of hydraulic oil to and from the variable valve timing mechanism 70.

That is, when the oil pump 75 is operated with the phase retarding oil passage 73 connected to the drain passage 77, and the phase advancing oil passage 72 connected to the supply passage 76, hydraulic oil in the oil pan 14 is delivered to the phase advancing oil passage 72 and hydraulic oil in the phase retarding oil passage 73 is returned to the oil pan 14. This drives the variable valve timing mechanism 70 to advance the relative rotational phase of the intake camshaft 34 relative to the crankshaft 24, so that the valve timing of the intake valves 32 is advanced.

On the other hand, when the oil pump 75 is operated with the oil control valve 74 connecting the phase retarding oil passage 73 to the supply passage 76, and connecting the phase advancing oil passage 72 to the drain passage 77, hydraulic oil in the oil pan 14 is delivered to the phase retarding oil passage 73 and hydraulic oil in the phase advancing oil passage 72 is returned to the oil pan 14. This drives the variable valve timing mechanism 70 to retard the relative rotational phase of the intake camshaft 34 relative to the crankshaft 24, so that the valve timing of the intake valves 32 is retarded.

Figure 5:
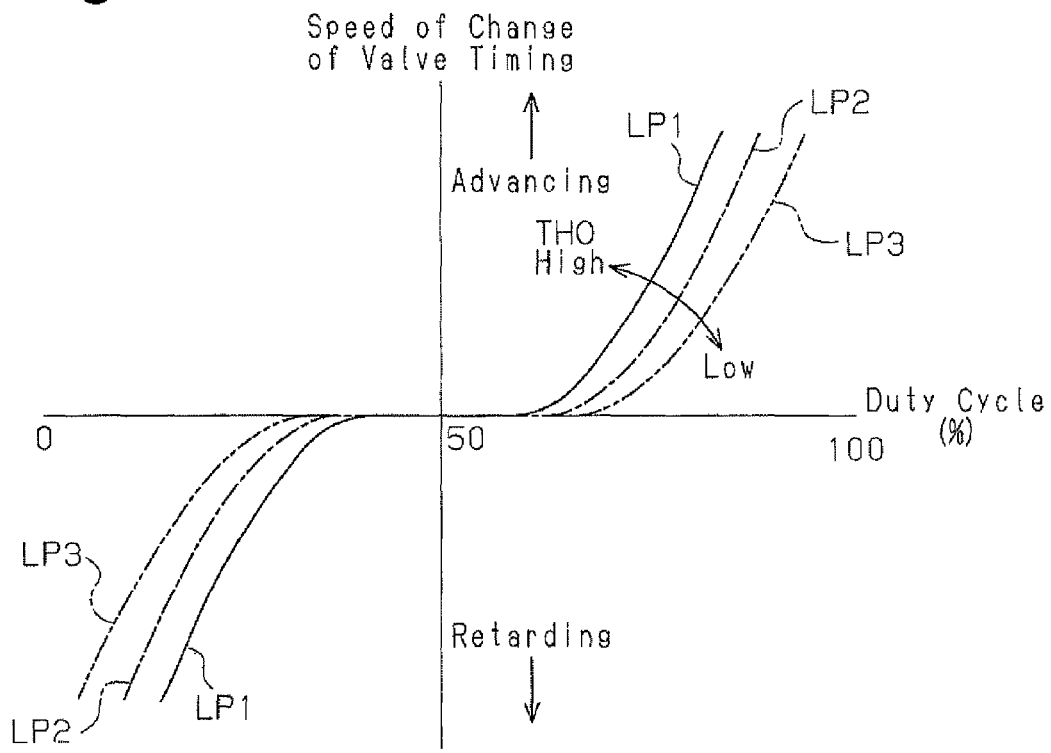
FIG. 5 is a graph showing the relationship between the speed of change of the valve timing and the duty cycle in a variable valve timing mechanism according to a second embodiment.

FIG. 5 shows the relationship between the duty cycle DVT of the drive signal for driving the oil control valve 74 and the speed of change of valve timing. The solid line LP1, the line formed by a long dash alternating with a short dash LP2, and the line formed by a long dash alternating with two short dashes LP3 represent changes in the order of an assumed higher hydraulic oil temperature THO. That is, the solid line LP1 represents changes in a case in which the hydraulic oil temperature is highest, the line formed by a long dash alternating with a short dash LP2 represents changes in a case in which the hydraulic oil temperature is lower than the case of the solid line LP1, and the line formed by a long dash alternating with two short dashes LP3 represents changes in a case in which the hydraulic oil temperature THO is lowest.

When the valve timing is retarded, the closer to 0% the duty cycle DVT, the more increased the amount of hydraulic oil supplied to the phase retarding oil passage 73 becomes as shown in FIG. 5. Accordingly, the valve timing is retarded at a greater speed of change. In contrast, when the valve timing is advanced, the closer to 100% the duty cycle DVT, the more increased the amount of hydraulic oil supplied to the phase advancing oil passage 72 becomes. Accordingly, the valve timing is advanced at a greater speed of change.

For example, when the valve timing is advanced, the lower the hydraulic oil temperature THO, the greater the value of the duty cycle DVT of the drive signal corresponding to the speed of change of the valve timing is set to as shown in FIG. 5. On the other hand, when the valve timing is retarded, the lower the hydraulic oil temperature THO, the smaller the value of the duty cycle DVT of the drive signal corresponding to the speed of change of the valve timing is set to. That is, the lower the hydraulic oil temperature THO, the higher the viscosity of the hydraulic oil becomes. Accordingly, responsiveness at supply and drain of the hydraulic oil to and from the variable valve timing mechanism 70 is lowered. To compensate for the lowered responsiveness, the duty cycle DVT is corrected based on the hydraulic oil temperature THO. Since the hydraulic oil temperature THO normally has a high correlation with the coolant temperature THW, the hydraulic oil temperature THO is estimated based on the coolant temperature THW. However, when the water pump 56 is stopped as described above, the correlation between the coolant temperature THW and the hydraulic oil temperature THO is lost. Thus, correction based on the hydraulic oil temperature THO (the coolant temperature THW) is inhibited.

Figure 6:
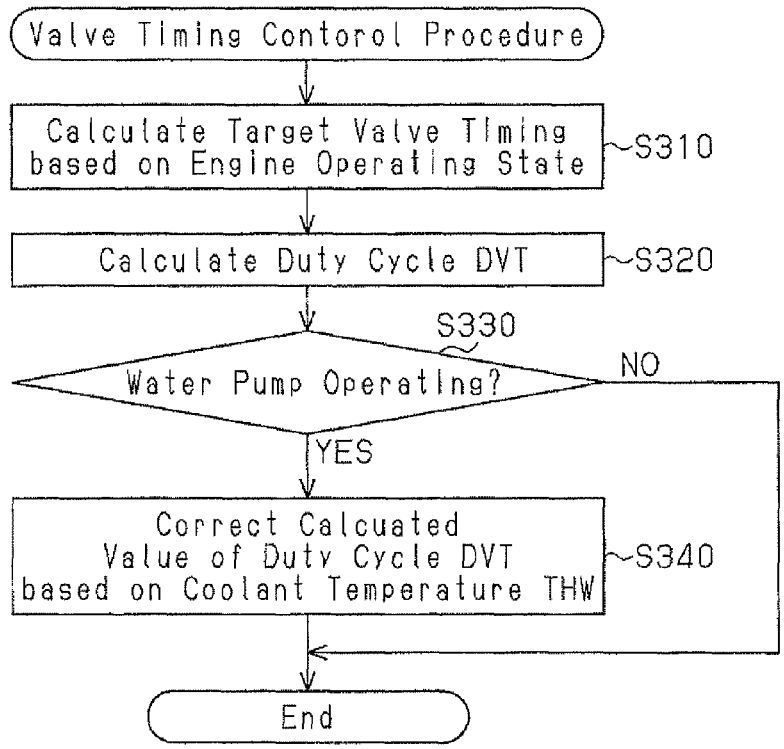
FIG. 6 is a flowchart showing a valve timing control procedure according to the second embodiment.

With reference to FIG. 6, a procedure for controlling the valve timing will be described. The procedure is repeated by the electronic control unit 91 at predetermined computation intervals.

First, the electronic control unit 91 calculates a target valve timing based on the engine operating state (step S310). Specifically, in a low speed and low load range, for example, at engine start or idling, the valve overlap between the intake valves 32 and the exhaust valves 33 is reduced, so that the amount of exhaust gas that is returned into the combustion chambers 22 is reduced to stabilize combustion. In contrast, in an intermediate load, for example, at start and acceleration of the vehicle, the valve timing of the intake valve 32 is advanced to increase the valve overlap, thereby reducing pumping loss.

Next, based on the difference between a target valve timing and the actual valve timing detected by the cam angle sensor 94 and the crank angle sensor 98, the duty cycle DVT of the drive signal to the oil control valve 74 is calculated by referring to a calculation map (step S320).

For example, if the actual valve timing is on the retarded side relative to the target valve timing, the duty cycle DVT is set to a value in the range 50%<DVT≤100% to advance the valve timing. The greater the difference between the target valve timing and the actual valve timing, the greater the value of the duty cycle DVT is set to in the above range. Therefore, as shown in FIG. 5, the valve timing is advanced at a greater speed of change. On the other hand, the smaller the difference between the target valve timing and the actual valve timing, the smaller the value of the duty cycle DVT is set to in the above range. Accordingly, the speed of change of the valve timing is reduced, so that the stability is improved when the actual valve timing is converged on the target valve timing.

In contrast, if the actual valve timing is on the advanced side relative to the target valve timing, the duty cycle DVT is set to a value in the range 0%≤DVT<50% to retard the valve timing. The greater the difference between the target valve timing and the actual valve timing, the smaller the value of the duty cycle DVT is set to in the above range. Therefore, as shown in FIG. 5, the valve timing is retarded at a greater speed of change. On the other hand, the smaller the difference between the target valve timing and the actual valve timing, the greater the value of the duty cycle DVT is set to in the above range. Accordingly, as in the case of advancing the valve timing, the speed of change of the valve timing is reduced, so that the stability is improved when the actual valve timing is converged on the target valve timing.

If the difference between the actual valve timing and the target valve timing has become significantly small through the above procedures, the duty cycle DVT is set to 50%. In this case, supply and drain of hydraulic oil to and from the variable valve timing mechanism 70 is stopped, so that the valve timing is maintained as is.

Next, it is determined whether the water pump 56 is operating (step S330). If it is determined that the water pump 56 is operating (step S330: YES), the calculated duty cycle DVT is corrected based on the coolant temperature THW, which has correlation with the hydraulic oil temperature THO. Specifically, when the coolant temperature THW is low and the viscosity of hydraulic oil is high, the duty cycle DVT is corrected based on the following expressions (4) and (5).

$$DVT \leftarrow DVT + \Delta DL1 \tag{4}$$

(50%<DVT≤100%)

$$DVT \leftarrow DVT - \Delta DL1 \tag{5}$$

(0%≤DVT<50%)

The value ΔDL1 is a function of the coolant temperature THW and is increased as the coolant temperature THW is lowered.

On the other hand, when the coolant temperature THW is high and the viscosity of hydraulic oil is low, the duty cycle DVT is corrected based on the following expressions (6) and (7).

$$DVT \leftarrow DVT - \Delta DL2 \tag{6}$$

(50%<DVT≤100%)

$$DVT \leftarrow DVT + \Delta DL2 \tag{7}$$

(0%≤DVT<50%)

The value ΔDL2 is a function of the coolant temperature THW and is increased as the coolant temperature THW is raised.

Since the duty cycle DVT is corrected based on the coolant temperature THW, the responsiveness of the variable valve timing mechanism 70 can be maintained at a certain level regardless of the viscosity of the hydraulic oil even if the viscosity of the hydraulic oil is different.

In contrast, if it is determined that the water pump 56 is not operated (step S330: NO), the current procedure is terminated without executing the correction based on the coolant temperature THW. That is, when there is a low correlation between the coolant temperature THW and the hydraulic oil temperature THO, and the operation responsiveness of the variable valve timing mechanism 70 cannot be estimated based on the coolant temperature THW, the correction process is inhibited so that it is not executed with a low reliability.

The present embodiment, which has been illustrated above, has the following advantages.

(2) When the water pump 56 is not operating, the correlation between the coolant temperature THW and the hydraulic oil temperature THO is lowered in some cases. In such a case, if the duty cycle DVT for driving the variable valve timing mechanism 70 is corrected based on the coolant temperature THW, the reliability of the procedure might be degraded. According to the present embodiment, when the water pump 56 is not operated, the duty cycle DVT for driving the oil control valve 74 is not corrected based on the coolant temperature THW. This prevents the reliability of the procedure for controlling the variable valve timing mechanism 70 from being deteriorated.

(Third Embodiment)

Figure 7:
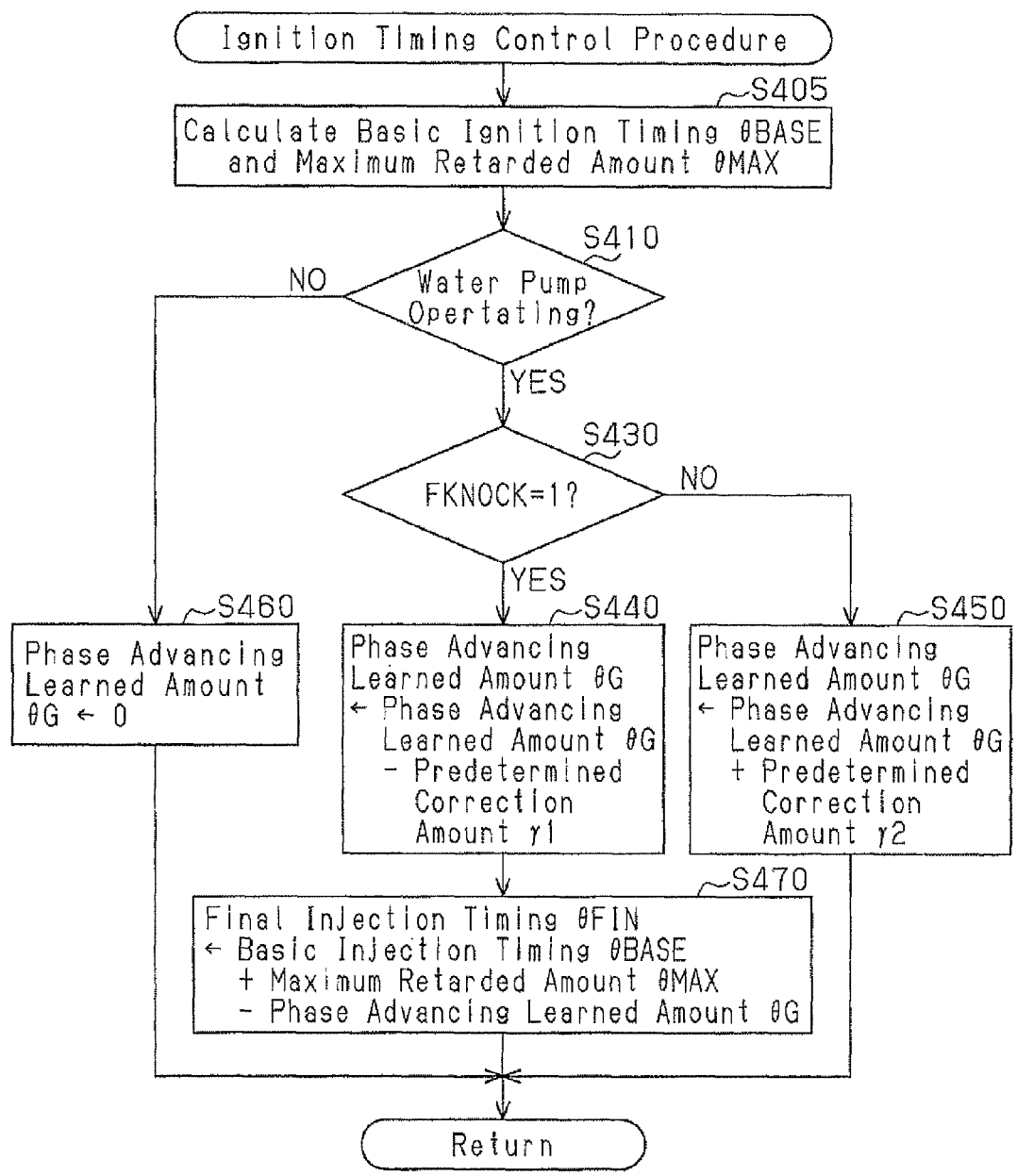
FIG. 7 is a flowchart showing an ignition timing control procedure according to a third embodiment.

A third embodiment according to the present invention will now be described with reference to FIG. 7. The differences from the first embodiment will be mainly discussed. Like or the same reference numerals are given to those components that are like or the same as the corresponding components of the first embodiment.

In the ignition timing control procedure, if it is determined that knocking is occurring based on the detection value of the knocking sensor 95, the ignition timing is retarded to a limit timing at which the knocking stops. On the other hand, if it is determined that knocking is not occurring, an ignition timing setting process is executed to advance the ignition timing to a limit timing at which knocking starts occurring. The amount of advancement that can be made without causing knocking is learned as a phase advancing learned amount. The phase advancing learned amount varies according to, for example, the amount of deposit collected on the inner walls of the combustion chambers 22 (in other words, a change over time of the compression ratio), changes over time of the state of spray of fuel injected by the fuel injection valves 26. Therefore, by learning the phase advancing learned amount in advance, the ignition timing can be advanced as much as possible without causing knocking. This, for example, increases the engine output.

However, when the water pump 56 is stopped and circulation of coolant is inhibited, the temperature state of the engine 1, particularly, the temperature state in the combustion chambers 22, may become a state that does not appear during a normal engine operation. If the phase advancing learned amount is learned in such a state, the combustion state of the internal combustion engine 1 may be degraded. In this regard, in the present embodiment, the learning of the phase advancing learned amount is inhibited when the water pump 56 is not operated.

Steps of the igniting timing control procedure of the present embodiment will now be described with reference to FIG. 7. The procedure is repeated by the electronic control unit 91 at predetermined computation intervals.

When the procedure is started, the electronic control unit 91 calculates a basic ignition timing θBASE and a maximum retarded amount θMAX based on the engine speed NE and the engine load (step S405). The basic ignition timing θBASE is a timing at which the maximum engine output in the engine operating state at the time can be produced. On the other hand, the maximum retarded amount θMAX is an amount by which the basic ignition timing θBASE can be retarded to a timing at which knocking does not occur even if the various conditions in the operating state are taken into consideration. That is, if the ignition timing is set to a value (θBASE+θMAX), the occurrence of knocking can be reliably prevented even though the engine output is lowered.

If it is determined that the water pump 56 is operating, that is, if it is determined that coolant is being circulated (step S410: YES), it is then determined whether a knocking determination flag FKNOCK is 1 (step S430). The knocking determination flag FKNOCK is set through another determination process based on whether knocking is occurring frequently or based on whether a state has continued in which no knocking occurs.

If it is determined that the knocking determination flag FKNOCK is 1 (step S430: YES), a phase retarding correction is executed. Specifically, when knocking repeatedly occurs, a predetermined correction amount γ1 is subtracted from the current phase advancing learned amount θG, and the resultant is set as a new phase advancing learned amount θG (step S440). The correction amount β1 is determined in advance. In contrast, if it is determined that the knocking determination flag FKNOCK is not 1 (step S430: NO), a phase advancing correction is executed. Specifically, when a state without knocking is continuing, a predetermined correction amount γ2 is added to the current phase advancing learned amount θG, and the resultant is set as a new phase advancing learned amount θG (step S450). The correction amount γ2 is determined in advance to a amount that is significantly smaller than the correction amount γ1.

After the phase advancing learned amount θG calculated in the above described manner, a final ignition timing θFIN is calculated based on the following expression (8) (step S470).

$$\theta FIN \leftarrow \theta BASE + \theta MAX - \theta G \qquad (8)$$

At step S410, if it is determined that the water pump 56 is not operating, that is, if it is determined that coolant is not circulating (step S410: NO), the phase advancing learned amount θG is set to 0 (step S460). That is, when coolant is not circulated, the temperature distribution and combustion state of air-fuel mixture in the combustion chambers 22 change from moment to moment. The final ignition timing θFIN is therefore set to a amount (θBASE+θMAX) based on the expression (8) to avoid occurrence of abnormal combustion such as knocking caused by advancement of ignition timing.

The present embodiment described above has the following advantages.

(3) When the water pump 56 is stopped the temperature state in the combustion chambers 22 becomes a state that does not appear during a normal engine operation, unlike a state in which the water pump 56 is operating. For example, great temperature differences occur between the combustion chambers 22. If the phase advancing learned amount θG is learned under such circumstances, an inappropriate value might be set as the phase advancing learned amount θG, and the combustion state of the internal combustion engine 1 may be degraded. According to the present embodiment, when the water pump 56 is stopped, the phase advancing learned amount θG is set to 0, and the ignition timing is retarded to the most retarded timing, so that the phase advancing learned amount θG is not set to an appropriate value. This prevents the combustion state of the engine 1 from being degraded.

(Fourth Embodiment)

Figure 8:
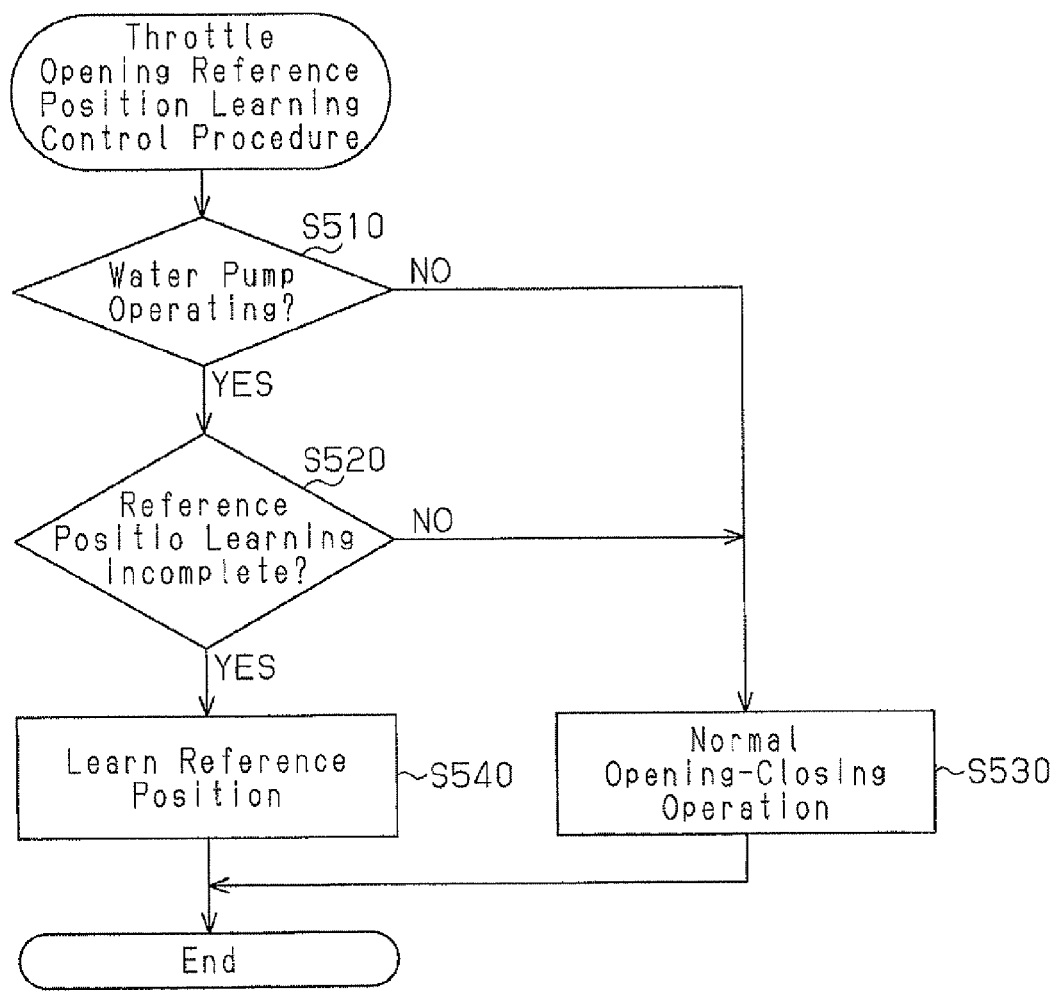
FIG. 8 is a flowchart showing a control procedure for learning a throttle opening degree reference position.

A fourth embodiment according to the present invention will now be described with reference to FIG. 8. The differences from the first embodiment will be mainly discussed. Like or the same reference numerals are given to those components that are like or the same as the corresponding components of the first embodiment.

Due to individual differences of the throttle sensor 96, errors may occur in detection of the throttle opening degree TA. Such detection errors may lower the accuracy of control of the throttle opening degree TA. Accordingly, in the present embodiment, the opening degree of the throttle valve 60 is mechanically restricted by the restricting section 64, and the detection value of the throttle sensor 96 obtained in this state is learned as a reference value when the throttle valve 60 is in a fully closed state (a throttle opening degree reference position learning control).

However, the output characteristic of the throttle sensor 96 has dependence on temperature. Thus, even if the reference opening degree of the throttle valve 60 is learned in a state in which the water pump 56 is stopped and circulation of coolant through the circulation passage 53a of the throttle body 63 is stopped, the learning result is not necessarily suitable for a procedure for controlling the throttle valve 60 in a normal engine operating state, that is, in a state in which coolant circulates through the circulation passage 53a in the throttle body 63. Therefore, in the present embodiment, a control procedure for learning the reference position of the throttle opening degree is inhibited when the water pump 56 is not operated and the circulation of coolant is stopped.

Hereinafter, with reference to FIG. 8, a procedure for controlling learning of the reference position of the throttle opening in the present embodiment will be described. The procedure is repeated by the electronic control unit 91 at predetermined computation intervals.

In the procedure, it is determined whether the water pump 56 is operating (step S510). When it is determined that the water pump 56 is operating (step S510: YES), it is then determined whether a full-close position learning has been completed (step S520). When it is determined that the reference position learning is incomplete (step S520: YES), the motor 61 is operated to maintain a state in which the opening degree of the throttle valve 60 is mechanically restricted by the restricting section 64. The electronic control unit 91 learns the output value of the throttle sensor 96 as a value (throttle opening degree TA) that corresponds to the fully closed state of the throttle valve 60 (step 540). On the other hand, when it is determined that the reference position learning has already been completed (step S520: NO), a normal opening-closing operation of the throttle valve 60 is performed (step S530).

Also, even if it is determined that the water pump 56 is stopped at step S510 (step S510; NO), the normal opening-closing operation of the throttle valve 60 is performed (step S530). That is, the reference position learning of step S540 is not executed.

The present embodiment described above has the following advantages.

(4) Unlike a state in which the water pump 56 is operating, the temperature state in the throttle valve 60 and the throttle sensor 96 becomes a state that does not appear during a normal engine operation when the water pump 56 is stopped. For example, a local temperature increase occurs in the throttle valve 60 and the throttle sensor 96. If a control procedure for learning the throttle opening degree reference position is executed under such circumstances, an inappropriate value may be learned as the reference position (fully closed position) of the throttle valve 60, which may degrade the reliability of the throttle opening control procedure. According to the present embodiment, the control procedure for learning the reference position of the throttle opening degree is not executed when the water pump 56 is not operating. This prevents a control procedure of low reliability from being executed.

The embodiments described thus far may be modified as necessary as shown below. Any of the above described embodiments and the following modifications may be combined if possible.

The present invention may be applied to an internal combustion engine that includes an air conditioning device having a heater core (not shown). The heater core allows coolant to circulate therethrough, thereby increasing the temperature of air. The air is in turn delivered to the passenger compartment for heating by a blower motor. When applied to such an engine, the heated air delivery may be stopped when the water pump 56 is not operated. Unlike a state in which the water pump 56 is operating, the temperature state in the heater core becomes a state that does not appear during a normal engine operation when the water pump 56 is stopped. For example, a local temperature increase occurs in the heater core. Under such circumstances, if heating is needed and the control therefor is started, the heater core will be excessively cooled. In the present embodiment, such drawbacks are prevented.

In the above embodiments, after the water pump 56 is operated, execution of the engine control is permitted. However, execution of the engine control procedure may be inhibited after the water pump 56 is operated and the coolant temperature THW converges on a certain value and enters stationary state.

After the water pump 56 is operated, the engine 1 remains under a temperature environment different from the normal environment until the coolant has circulated in the engine cooling system to some extent and the coolant temperature enters an equilibrium condition, even though the degree of difference is gradually reduced. According to the present embodiment, the execution of the above described engine control procedure is inhibited until coolant is circulated to a certain extent and the coolant temperature THW enters an equilibrium condition. Therefore, the present embodiment reliably prevents a control procedure from being executed with a low reliability or at an inappropriate timing.

In the embodiment illustrated above, an electric pump is uses as the water pump 56. However, an engine driven pump may be employed. An engine driven pump is coupled to the crankshaft via a clutch. When the clutch is engaged, the engine driven pump is operated by the power of the crankshaft. When the clutch is disengaged, the engine driven pump is stopped. This modification has advantages similar to those of the above illustrated embodiments.

In the above illustrated embodiment, the water pump 56 is stopped when the coolant temperature THW is lower than the reference temperature TX. However, the water pump 56 does not need to be completely stopped. That is, the water pump 56 may be controlled to operate at a discharge amount that is smaller than the discharge amount when the coolant temperature THW is higher than or equal to the reference temperature TX.

A control procedure that is inhibited while circulation of coolant is limited is not restricted to that exemplified in the above illustrated embodiment. The present invention may be applied to any control procedure if its reliability is lowered in an internal combustion engine that is under a temperature condition different from a normal state when coolant circulation is limited.

DESCRIPTION OF THE REFERENCE NUMERALS

1 . . . Internal Combustion Engine, 11 . . . Cylinder Block, 12 . . . Cylinder Head, 14 . . . Oil Pan, 21 . . . Cylinder, 22 . . . Combustion Chamber, 23 . . . Piston, 24 . . . Crankshaft, 26 ... Fuel Injection Valve, 27 ... Ignition Plug, 30 ... Intake Passage, 31 ... Exhaust Passage, 32 ... Intake Valve, 33 ... Exhaust Valve, 34 ... Intake Camshaft, 35 ... Exhaust Camshaft, 41 ... Exhaust Purification Catalyst, 50 ... Cooling Device, 51 ... Radiator, 52 ... Water Jacket, 53 ... Coolant Passage, 53a ... Flow Passage, 55 ... Bypass Passage, 56 ... Water Pump (Pump, Control Section), 57 ... Thermostat, 60 ... Throttle valve, 61 ... Motor, 63 ... Throttle Body, 64 ... Restricting Section, 70 ... Variable Valve Timing Mechanism, 71 ... Hydraulic Circuit, 72 ... Phase Advancing Oil Passage, 73 ... Phase Retarding Oil Passage, 74 ... Oil Control Valve, 75 ... Oil Pump, 76 ... Supply Passage, 77 ... Exhaust Passage, 91 ... Electronic Control Unit (Control Section, Correcting Section, Ignition Timing Learning Section, Reference Opening Degree Learning Section), 92 ... Coolant Temperature Sensor (Coolant Temperature Detecting Section), 94 ... Cam Angle Sensor, 95 ... Knock Sensor, 96 ... Throttle Opening Sensor, 97 ... Air-Fuel Ratio Sensor, 98 ... Crank Angle Sensor, 99 ... Accelerator Sensor.

The invention claimed is:

1. A control device for an internal combustion engine, comprising:
an engine cooling system through which coolant circulates;
a coolant temperature detecting section that detects a temperature of the coolant;
a pump that is capable of varying the discharge amount of the coolant independently of an engine operating state; and
a control section that controls (1) the discharge amount of the pump in the engine cooling system and (2) at least one other engine process in a separate system such that the circulation of the coolant in the engine cooling system is limited when the coolant temperature is lower than a reference temperature compared to when the coolant temperature is higher than the reference temperature,
wherein the control section (1) controls the at least one other engine process by using the detected coolant temperature as control information when the limit on the coolant circulation is lifted, and (2) stops controlling the at least one other engine process by using the detected coolant temperature as the control information until the limit on the coolant circulation is lifted, and
wherein the at least one other engine process is at least one of (i) a process for renewing an air-fuel ratio learned value used for correcting a fuel injection amount, (ii) a process for learning a reference opening degree of a throttle valve, and (iii) a process for learning an advancing amount of ignition timing required for preventing an occurrence of a knocking.

2. The control device for an internal combustion engine according to claim 1, wherein the control section, after the limit on the coolant circulation is lifted, continues to stop controlling the at least one other engine process by using the detected coolant temperature as the control information until the detected coolant temperature converges on a predetermined value and is stabilized.

3. The control device for an internal combustion engine according to claim 1, wherein the pump is an electric pump.

4. The control device for an internal combustion engine according to claim 1, wherein the pump is an engine driven pump, which is coupled to an engine output shaft via a clutch and is driven by the engine output shaft.

5. A control device for an internal combustion engine, comprising:
an engine cooling system through which coolant circulates;
a coolant temperature detecting section that detects a temperature of the coolant;
a pump that is capable of varying the discharge amount of the coolant independently of an engine operating state;
a control section that controls the discharge amount of the pump such that the circulation of the coolant in the engine cooling system is limited when the coolant temperature is lower than a reference temperature compared to when the coolant temperature is higher than the reference temperature; and
a hydraulically driven variable valve timing mechanism that changes the valve timing of at least one of an intake valve and an exhaust valve,
wherein the control section (1) corrects a duty cycle of a drive signal to the variable valve timing mechanism based on the detected coolant temperature when the limit on the coolant circulation is lifted, and (2) stops correcting the duty cycle of the drive signal to the variable valve timing mechanism based on the detected coolant temperature until the limit on the coolant circulation is lifted.

6. The control device for an internal combustion engine according to claim 5, wherein the control section, after the limit on the coolant circulation is lifted, continues to stop correcting the duty cycle of the drive signal to the variable valve timing mechanism based on the detected coolant temperature until the detected coolant temperature converges on a predetermined value and is stabilized.

7. The control device for an internal combustion engine according to claim 5, wherein the pump is an electric pump.

8. The control device for an internal combustion engine according to claim 5, wherein the pump is an engine driven pump, which is coupled to an engine output shaft via a clutch and is driven by the engine output shaft.

9. A method for controlling an internal combustion engine including an engine cooling system through which coolant circulates, the method comprising:
detecting a temperature of the coolant with a coolant temperature detecting section; and
controlling with a control section (1) the discharge amount of a pump in the engine cooling system, the pump capable of varying the discharge amount of the coolant independently of an engine operating state and (2) at least one other engine process in a separate system such that the circulation of the coolant in the engine cooling system is limited when the coolant temperature is lower than a reference temperature compared to when the coolant temperature is higher than the reference temperature, and
controlling the at least one other engine process by using the detected coolant temperature as control information when the limit on the coolant circulation is lifted, and stopping controlling the at least one other engine process by using the detected coolant temperature as the control information until the limit on the coolant circulation is lifted, the step being performed by the control section,
wherein the at least one other engine process is at least one of (i) a process for renewing an air-fuel ratio learned value used for correcting a fuel injection amount, (ii) a process for learning a reference opening degree of a throttle valve, and (iii) a process for learning an advancing amount of ignition timing required for preventing an occurrence of a knocking.

10. A method for controlling an internal combustion engine including an engine cooling system through which coolant circulates, the method comprising detecting a temperature of the coolant with a coolant temperature detecting section;

controlling with a control section the discharge amount of a pump such that the circulation of the coolant in the engine cooling system is limited when the coolant temperature is lower than a reference temperature compared to when the coolant temperature is higher than the reference temperature, the pump capable of varying the discharge amount of the coolant independently of an engine operating state;

changing the valve timing of at least one of an intake valve and an exhaust valve with a hydraulically driven variable valve timing mechanism, the step being performed by the control section, and correcting a duty cycle of a drive signal to the variable valve timing mechanism based on the detected coolant temperature when the limit on the coolant circulation is lifted, and stopping correcting the duty cycle of the drive signal to the variable valve timing mechanism based on the detected coolant temperature until the limit on the coolant circulation is lifted.

\* \* \* \* \*